US011113420B2

(12) United States Patent
Du et al.

(10) Patent No.: US 11,113,420 B2
(45) Date of Patent: Sep. 7, 2021

(54) POLICY BASED CLIPBOARD ACCESS

(71) Applicant: VMware, Inc., Palo Alto, CA (US)

(72) Inventors: Xinpi Du, Atlanta, GA (US); Ali Mohsin, Alpharetta, GA (US)

(73) Assignee: VMware, Inc., Palo Alto, CA (US)

( * ) Notice: Subject to any disclaimer, the term of this patent is extended or adjusted under 35 U.S.C. 154(b) by 305 days.

(21) Appl. No.: 15/936,840

(22) Filed: Mar. 27, 2018

(65) Prior Publication Data

US 2019/0303596 A1 Oct. 3, 2019

(51) Int. Cl.
*G06F 21/62* (2013.01)
*G06F 9/54* (2006.01)
*G06F 16/24* (2019.01)
*G06F 21/60* (2013.01)

(52) U.S. Cl.
CPC ............ *G06F 21/629* (2013.01); *G06F 9/543* (2013.01); *G06F 16/24* (2019.01); *G06F 21/602* (2013.01)

(58) Field of Classification Search
CPC ...... G06F 21/629; G06F 21/602; G06F 16/24; G06F 9/543
See application file for complete search history.

(56) References Cited

U.S. PATENT DOCUMENTS

| | | | |
|---|---|---|---|
| 9,893,898 B2* | 2/2018 | Kreft | G06Q 20/223 |
| 2012/0036370 A1* | 2/2012 | Lim | H04L 63/06 |
| | | | 713/189 |
| 2014/0032691 A1* | 1/2014 | Barton | H04L 41/00 |
| | | | 709/206 |
| 2014/0267339 A1* | 9/2014 | Dowd | H04M 1/00 |
| | | | 345/581 |
| 2018/0039385 A1* | 2/2018 | Worley | G06F 9/543 |

* cited by examiner

*Primary Examiner* — Alexander Lagor
*Assistant Examiner* — William B Jones
(74) *Attorney, Agent, or Firm* — Thomas Horstemeyer, LLP (57) ABSTRACT

Disclosed are various examples for providing access to a clipboard based at least in part on one or more policies. Data is received from a client application. A permission associated with the client application is checked, the permission specifying that the client application is authorized to store data in a clipboard provided by an operating system of the computing device. In response, the data received from the client application is stored in the clipboard.

17 Claims, 6 Drawing Sheets

POLICY BASED CLIPBOARD ACCESS

BACKGROUND

Many operating systems provide for a data buffer to temporarily store data, often referred to as a "clipboard." The clipboard is often accessible to multiple applications. For instance, an application can copy or otherwise store data in the clipboard, which another application can subsequently read or otherwise access.

In some instances, a developer might wish to override the default behavior of the clipboard. For example, actions such as copying or storing data to clipboard might need to be disabled. As another example, a developer might need to prohibit an application from reading or otherwise accessing the clipboard. This functionality is typically implemented on an application-by-application basis. This can result in inconsistent interactions with the clipboard as different developers of different applications may override the default behaviors of the clipboard in different ways. If the devices are managed devices belonging to an enterprise, security issues could arise due to some applications installed on a device implementing security controls for accessing the clipboard while other applications fail to implement security controls.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various examples for providing access to functions of a clipboard or similar temporary data buffer according to rules established in one or more policies. For example, a user of a mobile device in an enterprise setting can be restricted from copying data when using certain applications (e.g., enterprise web applications, document viewing or editing software). Likewise, a user can be similarly restricted. Restrictions can be applied on a per user, per device, or per application basis through the application of one or more policies.

These policies have often been applied through the use of a software development kit (SDK) or similar shared library. Applications that are developed using the SDK or incorporate the shared library are able to consistently grant or deny access to clipboard functions based on the policies. This increases the consistency with which applications can implement policy based access to the clipboard. However, this approach requires that every application use the SDK. Applications that fail to use the SDK or shared library will be able to bypass the policy-based restrictions. For example, a user of a document viewer with copy and paste disabled can install a second document viewer that does not implement the SDK or shared library in order to by-pass the restrictions.

In order to enforce policy-based restrictions to the clipboard on a system-wide basis, the clipboard functionality provided by the operating system itself must be modified. There are various approaches that could be used to accomplish this depending on the particular operating system. For example, in most versions of the ANDROID® operating system, the class ClipBoardManager provides clipboard functionality to all applications installed on the computing device. By creating a subclass of the ClipBoardManager class, as further described in this application, the functionality of the clipboard can be modified for all applications installed on the computing device. As another example, SAMSUNG® client devices use a custom version of ANDROID with hidden classes that are provided by the JAVA compiler at runtime. Because the classes are provided by the compiler instead of the ANDRIOD operating system, they cannot be extended. In these instances, a shim can be created to allow the classes to be extended by a subclass. These solutions, among others, are further described in this application.

Figure 1:
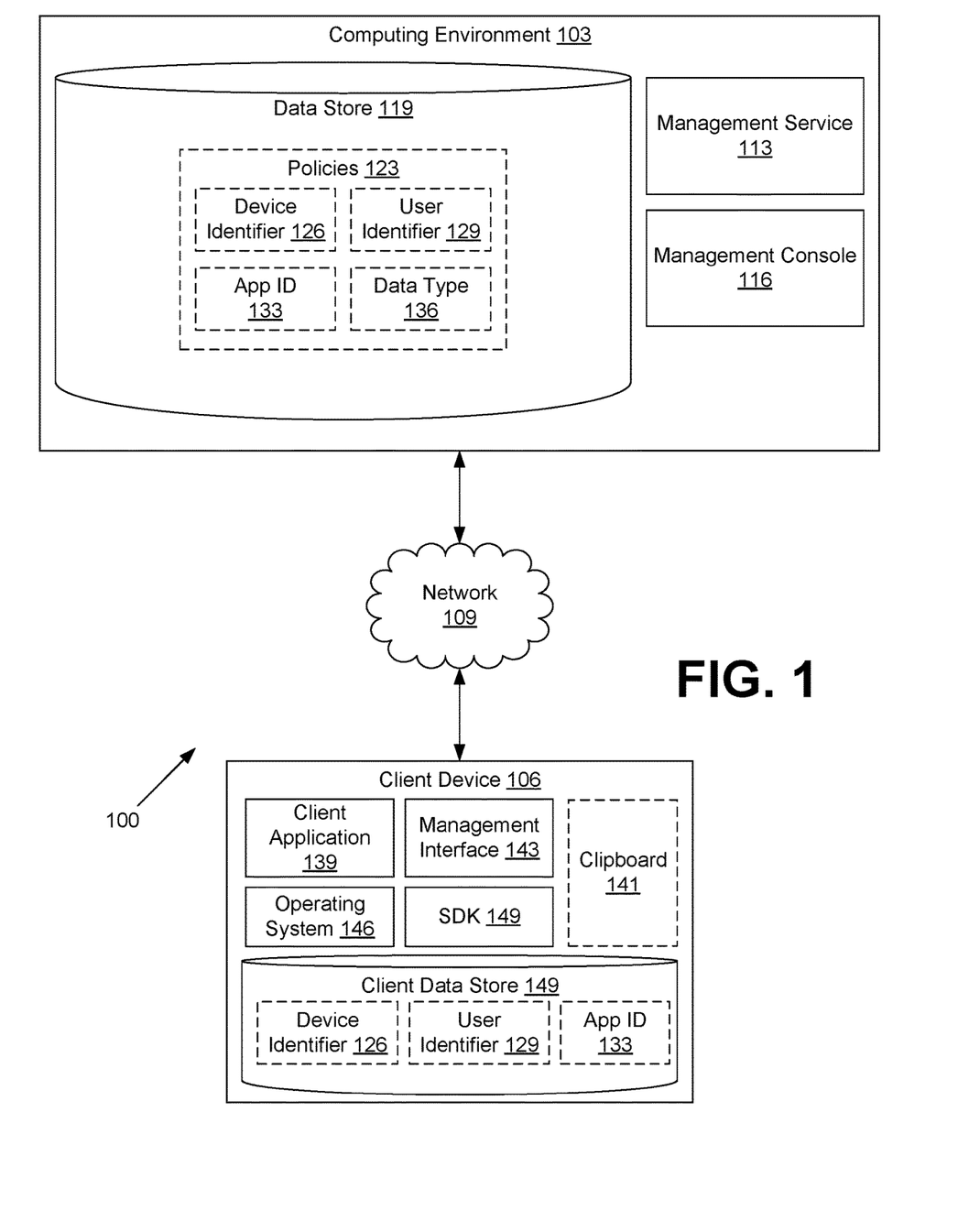
FIG. 1 is a schematic block diagram depicting an example of a network environment

Beginning with FIG. 1, shown is an example of a networked environment 100. The networked environment 100 includes a computing environment 103 and a client device 106, which are in data communication with each other via a network 109. The network 109 includes wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The computing environment 103 can include, for example, a server computer or any other system providing computing capability. Alternatively, the computing environment 103 can employ a plurality of computing devices that can be arranged, for example, in one or more server banks or computer banks or other arrangements. These computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the managed computing environment 103 according to various examples. The components executed on the managed computing environment 103, for example, can include a management service 113, a management console 116, and other applications, services, processes, systems, engines, or functionality not discussed in detail herein.

Also, various data is stored in a data store 119 that is accessible to the computing environment 103. The data store 119 can be representative of a plurality of data stores, which can include relational databases, object-oriented databases, hierarchical databases, hash tables or similar key-value data stores, as well as other data storage applications or data structures. The data stored in the managed data store 119 is associated with the operation of the management service 113 as well as potentially other applications or functional entities described later. This data can include one or more policies 123 and potentially other data.

The management service 113 can be executed to oversee the operation of client devices 106 enrolled with the management service 113. In some examples, an enterprise, such as a company, organization, or other entity, can operate the management service 113 to oversee or manage the operation of the client devices 106 of its employees, contractors, customers, or other users having accounts with the enterprise. The management service can further cause policies 123 to be implemented on a client device 106.

The management console 116 provides an interface for client devices 106 to interact with and control the operation of the management service 113. For example, the management console 116 can include a web server that generates one or more web pages that can be displayed on the client device 106. An administrative user can interact with the web pages served by the management console 116 to add users, devices, or policies 123 to or remove users, devices, or policies 123 from the management service 113. Likewise, an administrative user can interact with these web pages to modify values for one or more settings of the management service 113. In addition, the management console 116 can also provide a public application programming interface (API) that is accessible across the network 109. Standalone applications installed on the client device 106 can call or otherwise invoke one or more functions provided by the API to programmatically control the operation of the management service 113, including adding users, devices, or policies 123 to or removing users, devices, or policies 123 from the management service 113. Similarly, the API can be used to modify settings for users, devices, or policies 123.

A policy 123 specifies a capability of a client device 106 that is authorized or prohibited based on various criterion. A policy 123 can also specify an action that is to be performed by a client device 106 in response to the client device 106 being in a particular state. For instance, a policy 123 can specify that copying data from an application is prohibited, or that it is only allowed for a particular user, a particular client device 106, or a combination thereof (e.g., specified users can only copy from a web browser when using a company issued mobile phone). A policy 123 could similarly specify that pasting data into an application is prohibited, or that it is only allowed for a particular user, a particular client device 106, or a combination thereof (e.g., specified users can only paste into their email when using a company issued tablet). A policy 123 could also specify actions that are required when a particular user copies and pastes data (e.g., all data must be encrypted when copied). A policy 123 can include one or more of a device identifier 126, a user identifier 129, an application identifier 133, or a data type 136, which can be used to determine whether the policy is applicable.

The device identifier 126 is an identifier that uniquely identifies a client device 106 enrolled with or registered with the management service 113. One or more device identifiers 126 can be included in or linked to a policy 123 in order to indicate that the policy 123 is applicable to the client device(s) 106 identified by the device identifier(s) 126. Examples of device identifiers 126 include serial numbers, international mobile equipment identity (IMEI) numbers, and media access control (MAC) addresses. In some instances, the device identifier 126 can be generated by the management service 113 and assigned to a client device 106 during registration or enrollment (e.g., incremental numbers or similar counters).

The user identifier 129 is an identifier that uniquely identifies a user or other individual that uses one or more client devices 106 enrolled or registered with the management service 113. One or more user identifiers 129 can be included in or linked to a policy 123 in order to indicate that the policy 123 is applicable to a particular user or individual regardless of the client device 106 currently used by the user. Examples of user identifiers 129 include usernames, electronic mail addresses, user identification numbers (e.g., incrementally generated numbers), or similar forms of user identification.

The application identifier 133 is an identifier that uniquely identifies a client application 139 with respect to other client applications 139. One or more application identifiers 133 can be included in or linked to a policy 123 in order to indicate that the policy 123 is applicable to particular client application(s) 139.

The data type 136 indicates the type(s) of data for which the policy is applicable. Data type(s) 136 can include text data, binary data, image data, or other types of data. In some instances, a file type identifier can be used as a data type 136.

The client device 106 is representative of a plurality of client devices 106 that can be coupled to the network 109. The client device 106 can include, for example, a processor-based system such as a computer system. Examples of these computer systems can include a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), or other devices with like capability. The client device 106 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection.

The client device 106 can be configured to execute various applications such as one or more client applications 139, the management interface 143, or other applications.

Various functions of the client device 106 can be provided by or coordinated by an operating system 146 installed on the client device 106 (e.g., ANDROID®, IOS®, WIN- DOWS®, etc.). For example, the operating system 146 can provide for a clipboard 141 that can be used by one or more client applications 139 installed on the client device 106. A software development kit (SDK) 149 can also be installed on the client device 106.

The management interface 143 can be a browser-based web-application or, in some instances, a standalone application that allows for a user to interact with the management console 116. For example, the management interface 143 can be a web-page served by the management console 116. As another example, the management interface 143 can be a standalone application that interacts with an application programming interface (API) provided by the management console 116. Accordingly, the management interface 143 can cause a user interface to appear on the display. To this end, the user interface can include a web page, an application screen, of other user mechanism for obtaining user input. The management interface 143 can allow an administrative user to control the management console 116. For example, the management interface 143 can provide a user interface that allows an administrative user to create, delete, or modify one or more policies 123.

The SDK 149 can include a set of libraries that can be dynamically or statically linked to one or more client applications 139. Each library in the SDK 149 can provide one or more functions to a client application 139 that links to or otherwise implements or incorporates the SDK 149. In some instances, the SDK 149 can also override one or more functions provided by the operating system 146. As a result, the SDK 149 can influence or impact the operation of client applications 139 that are not linked to or otherwise incorporate the SDK 149. For example, the SDK 149 can include components that change how the operating system 146 controls access to the clipboard 141. In this example, the installation of the SDK 149 could alter how all client applications 139 installed on the client device 106 access the clipboard 141 regardless of whether individual ones of the client applications 139 linked to or otherwise incorporated the functionality provided by the SDK 149.

The clipboard 141 can be a data buffer provided by the operating system 146 for short-term data storage or data transfer between one or more client applications 139. In some instances, the clipboard 141 can be a single-transaction clipboard 141, where data stored to the clipboard 141 by a client application 139 overwrites the data previously stored in the clipboard 141. However, a multiple transaction clipboard 141 can be provided by some operating systems 143. In some examples, the data stored in the clipboard 141 can be deleted by the operating system 146 when the client device is powered off or rebooted. However, some clipboard 141 implementations can preserve the contents of the clipboard across reboots.

Also, various data can be stored in a client data store 149 that is accessible to the client device 106. The client data store 149 can be representative of a plurality of data stores, which can include relational databases, object-oriented databases, hierarchical databases, hash tables or similar key-value data stores, as well as other data storage applications or data structures. The data stored in the client data store 149 is associated with the operation of the client application 139, the management console 116, and the operating system 146, as well as potentially other applications described later. This data can include a device identifier 126, a user identifier 129, or an application identifier 133.

Next, a general description of the operation of the various components of the networked environment 100 is provided. A more detailed description of the implementations of various examples of the present disclosure is provided later in the discussion of the subsequent figures.

To begin, a user causes a client application 139 to attempt to store data to the clipboard 141. For example, the user can highlight and select highlighted text in a document. As another example, the user can select an image, video, or a file. In response to the selection, the client application 139 makes a call to an application programming interface (API) provided by the operating system 146 to access the clipboard 141.

However, the API call is intercepted and processed by the SDK 149. The SDK 149 can determine the application identifier 133 of the client application 139, the user identifier 129 of the user interacting with the client application 139, and the device identifier 126 of the client device 106. This information can be sent in a query to the management service 113. In some instances, the data type 136 for the data to be stored in the clipboard 141 can be included in the query.

The management service 113 can evaluate the query received from the SDK 149 to determine whether the access to the clipboard 141 of the client device 106 is permitted. Accordingly, the management service 113 can search the data store 119 to determine which policies 123 have been assigned or applied to the user, client device 106 or client application 139 by searching for policies that are linked to the provided device identifier 126, user identifier 129, or application identifier 133. The management service 113 can then evaluate the matching policies 123 to determine whether access to the clipboard 141 is permitted. The management service 113 can then return the result to the SDK 149.

The SDK 149 evaluates the result of the query and performs an appropriate action. For example, if the user is prohibited from accessing the clipboard 141 in this context (e.g., a policy 123 prohibits the user from accessing the clipboard or a policy 123 prohibits the user from using the client application 139 to access the clipboard), then the SDK 149 can cause a context menu or similar user interface element to have the option(s) for accessing the clipboard omitted, greyed out, or otherwise rendered inactive. In some examples, this can involve rendering a customized user interface element. In other examples this can involve modifying the user interface element provided by the operating system 146.

Figure 2:
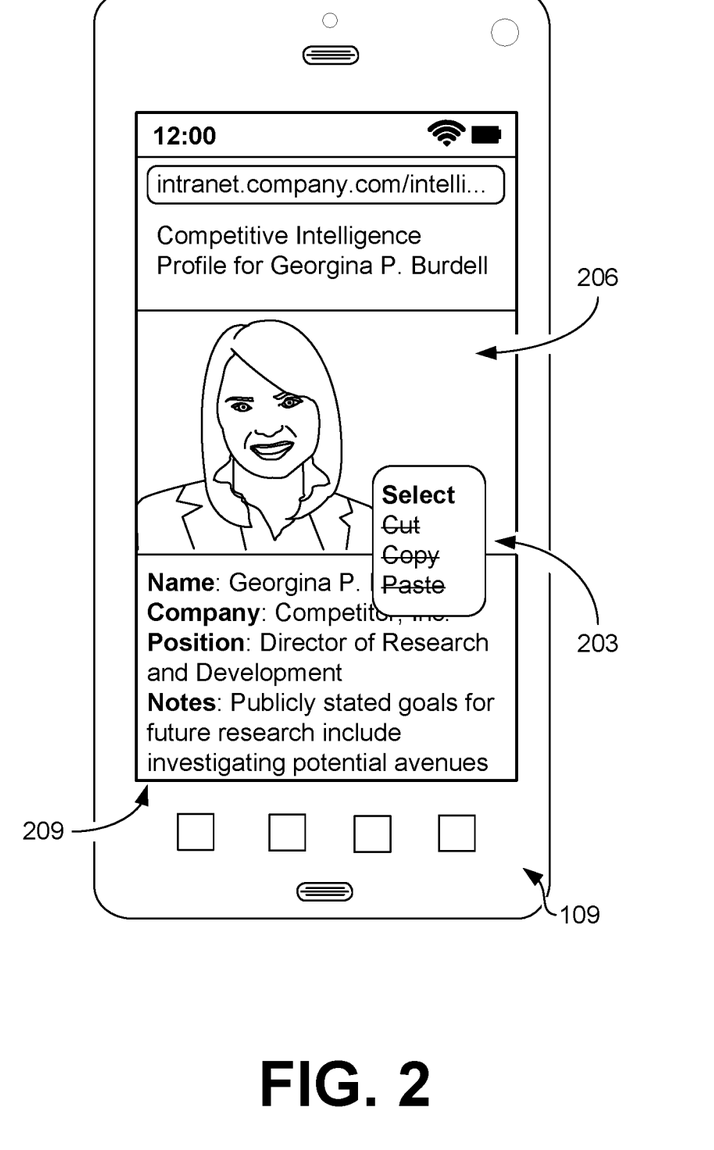
FIG. 2 is a user interface diagram depicting an operation of a component of the network environment of FIG. 1.

FIG. 2 depicts the operation of an example of a client device 109 according to various examples of the present disclosure. As illustrated, a user interface control 203 is presented within a user interface 206 rendered on the display 209 of the client device 109. The user interface control 203 lists a number of potential options that a user could select for saving data from the client application 139 to the clipboard 141 or for accessing data in the clipboard 141 from the client application 139. As illustrated, functions such as "CUT," "COPY," and "PASTE" are struck through to indicate that these functions have been disabled as the result of an application of one or more policies 123. In alternative implementations, these options could be hidden from the user interface 206 instead.

Figure 3:
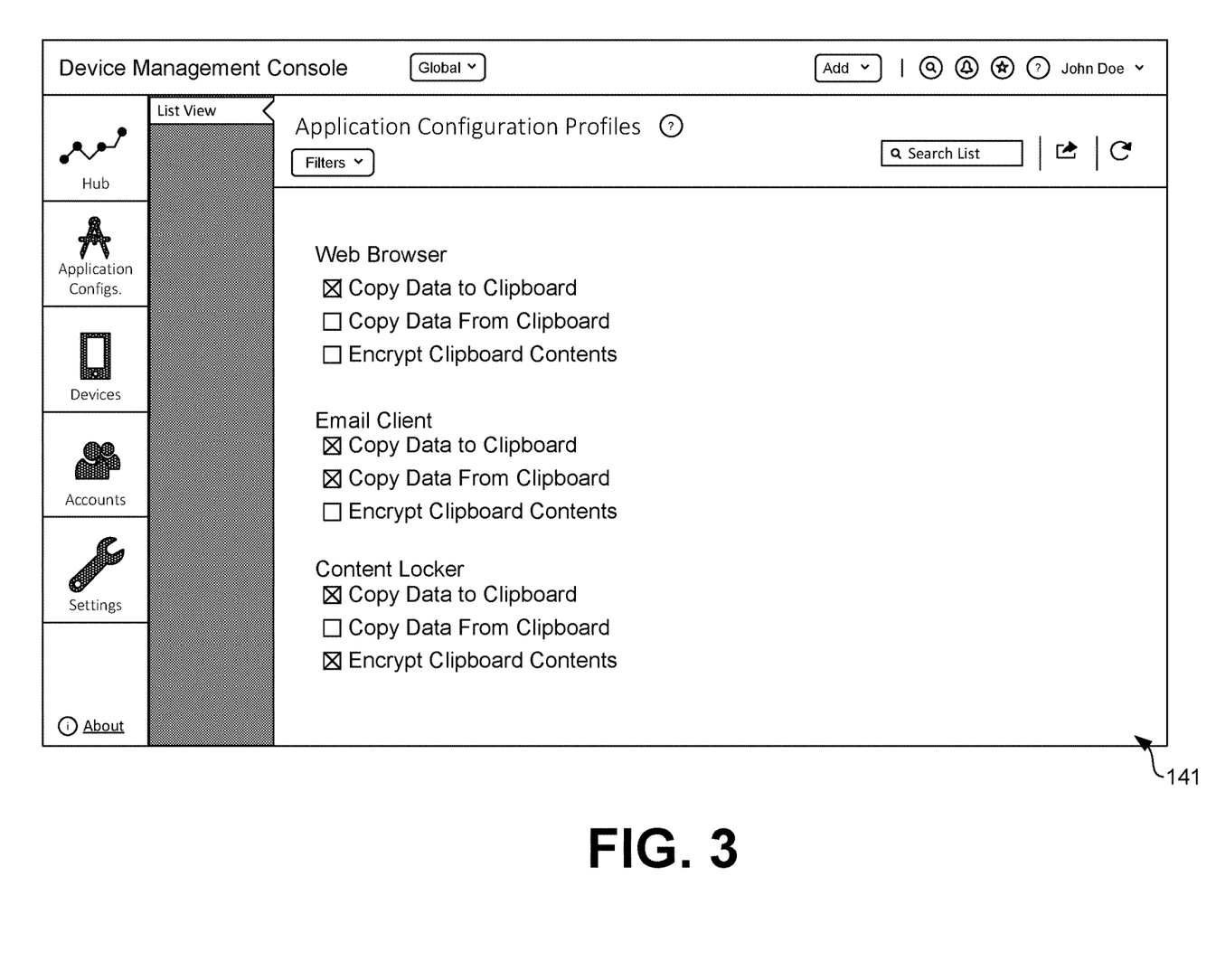
FIG. 3 is a user interface diagram depicting an operation of a component of the network environment of FIG. 1.

FIG. 3 depicts the operation of the management interface 143 according to various examples of the present disclosure. As illustrated, the management interface 143 provides a webpage for an administrative user to interact with the management console 116 to specify values or settings for one or more policies 123. Here, the administrative user can specify how individual client applications 139 are permitted to use the clipboard 141 of a client device 106. Example settings include enabling or disabling the ability of a client application 139 to copy data to the clipboard 141, access or read data from the clipboard 141, or encrypt all data stored to the clipboard 141. It is understood that other actions or limitations can be available to an administrative user. Moreover, a similar interface of the management interface 143 can be used to specify how individual users or individual client devices 106 are allowed to use the clipboard 141.

Figure 4:
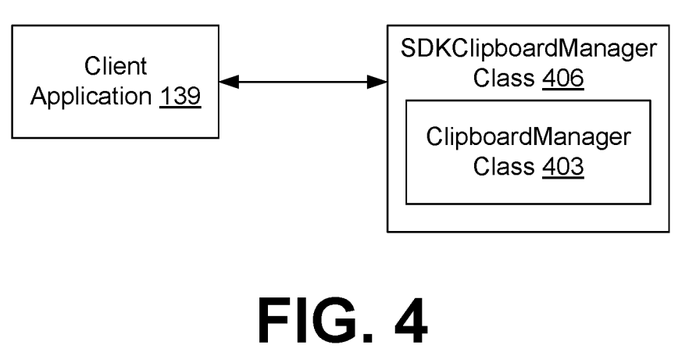
FIG. 4 is a class diagram depicting the relationships between various components of the client application and operating system of the client device of the network environment of FIG. 1

FIG. 4 is a class diagram illustrating one approach used by the SDK 149 for providing policy based clipboard access. Shown are a ClipboardManager class 403, an SDKClipboardManager class 406, and the client application 139. The operations of these components and their interactions are described in the following paragraphs.

In this example, the ClipboardManager class 403 is a system class provided by the ANDROID operating system. In ANDROID systems, when a client application 139 copies to or pastes from the clipboard 141, an instance of ClipboardManager class 403 is internally constructed by the ANDROID operating system 146. However, the ClipboardManager class 403 is a private class that is not exposed by the ANDROID operating system 146.

However, the ClipboardManager class 403 can be bypassed. The SDK 149 can include a folder with the path "android/content" to allow the SDK 149 to include a subclass of the ClipboardManager class 403, illustrated as the SDKClipboardManager class 406. As a result, the SDKClipboardManager class 406 is also an instance of the ClipboardManager class 403. The constructor for the SDKClipboardManager class 406 can pass a real instance of the ClipboardManager class 403 as a delegate, allowing the SDKClipboardManager class 406 to act as a wrapper for the ClipboardManager class 403.

The SDKClipboardManager class 406 can override all methods of the ClipboardManager class 403. For methods that implement functionality that is to be intercepted (e.g., copying data to the clipboard if a restriction on copying is enabled), the additional functionality can be provided in the method. For those methods which do not need to be extended, the delegate.method( ) function can be called.

As a result, when the client application 139 attempts to use the clipboard 141, the client application 139 can provide with an instance of the SDKClipboardManager class 406 instead of the ClipboardManager class 403. The SDKClipboardManager class 406 can enforce any applicable policies 123 specified for particular functions of the clipboard 141. For example, the SDKClipboardManager class 406 could override the functions that implement copying or cutting data and storing it in the clipboard 141 in order to add compliance checks to enforce one or more policies 123. As another example, the SDKClipboardManager class 406 could override the functions that involve accessing (e.g. pasting) data stored in the clipboard 141 in order to add compliance checks to enforce one or more policies 123.

Figure 5:
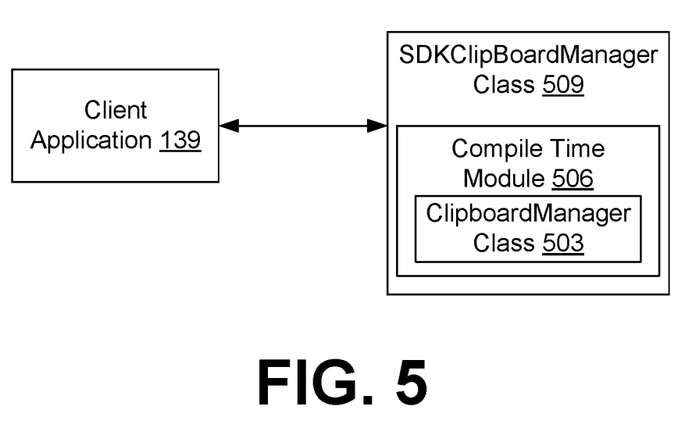
FIG. 5 is a class diagram depicting the relationships between various components of the client application and operating system of the client device of the network environment of FIG. 1

FIG. 5 is a class diagram illustrating another approach used by the SDK 149 for providing policy based clipboard access. Shown are a ClipboardManager class 503, a compile time module 506, an SDKClipboardManager class 509, and the client application 139. The operations of these components and their interactions are described in the following paragraphs.

In some instances, vendors can make modifications or customizations to the ANDROID operating system 143. For example, the default ClipboardManager class provided by ANDROID can be replaced by another class. The code for these replacement classes is often also not be exposed or otherwise available. For instance, the code for these replacement classes is sometimes only made available through the JAVA® runtime used by ANDROID. As a result, these replacement classes are invisible or to client applications 139 in contrast to private classes which are visible but access restricted.

In these implementations, the clipboard manager class 503 is inspected at runtime, which can allow the clipboard manager class 503 to be recreated as a compile time only module 506. The compile time only module 506 can allow for the SDKClipboardManager class 509 to act as a subclass of the clipboard manager class 503 and pass all compile time tests. However, the compile time only module 506 is excluded from the binary implementation of the SDKClipboardManager class 509 in order to avoid runtime errors resulting from duplicate class definitions. Instead, the SDKClipboardManager class 509 extends the ClipboardManager class 503 in order to link to the ClipboardManager class 503 at runtime as a result of the SDKClipboardManager class 509 being compiled against the compile time only module 506.

As a result, the SDKClipboardManager class 509 is also an instance of the ClipboardManager class 503. The constructor for the SDKClipboardManager class 509 can pass a real instance of the ClipboardManager class 503 as a delegate, allowing the SDKClipboardManager class 509 to act as a wrapper for the ClipboardManager class 503.

The SDKClipboardManager class 509 can override all methods of the ClipboardManager class 503. For methods that implement functionality that is to be intercepted (e.g., copying data to the clipboard if a restriction on copying is enabled), the additional functionality can be provided in the method. For those methods which do not need to be extended, the delegate.method( ) function can be called.

As a result, when the client application 139 attempts to use the clipboard 141, the client application 139 is provided with an instance of the SDKClipboardManager class 509 instead of the ClipboardManager class 503. The SDKClipboardManager class 509 can enforce any applicable policies 123 specified for particular functions of the clipboard 141. For example, the SDKClipboardManager class 509 could override the functions that implement copying or cutting data and storing it in the clipboard 141 in order to add compliance checks to enforce one or more policies 123. As another example, the SDKClipboardManager class 509 could override the functions that involve accessing (e.g. pasting) data stored in the clipboard 141 in order to add compliance checks to enforce one or more policies 123.

Figure 6:
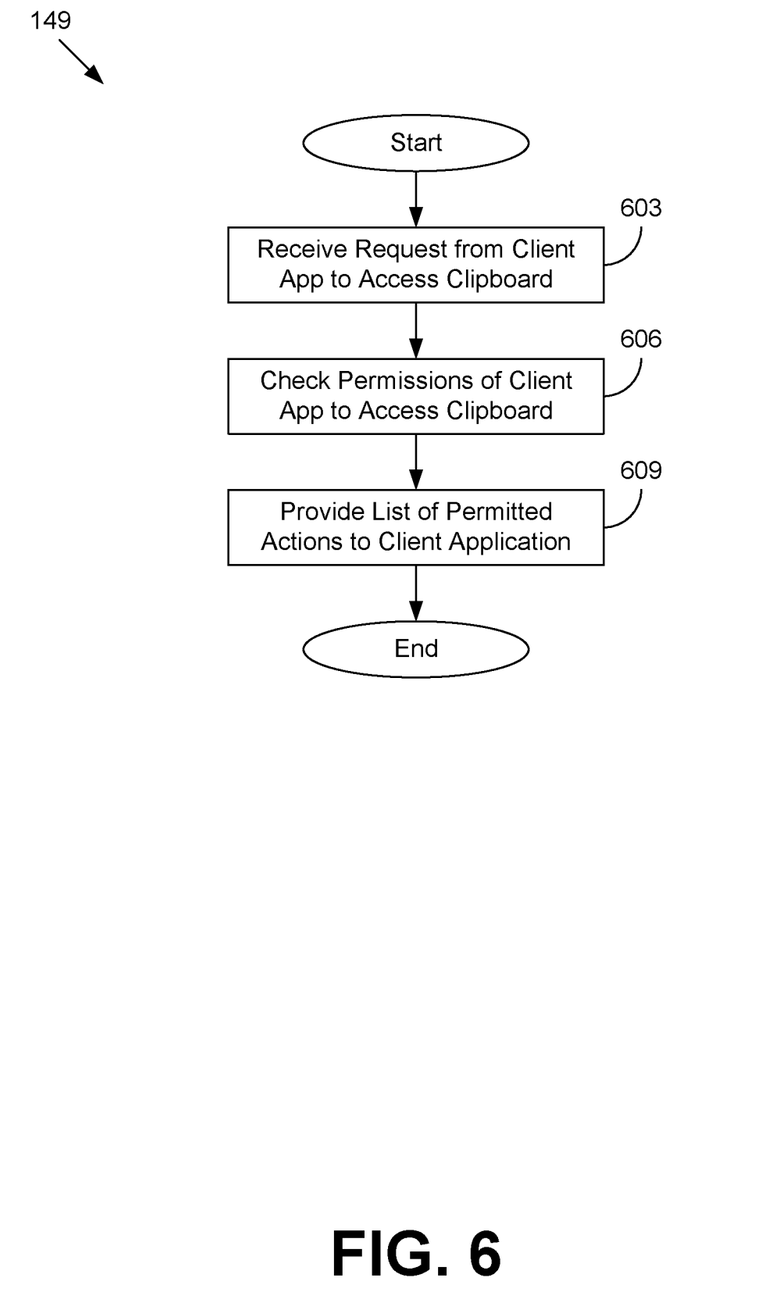
FIG. 6 is a flow chart depicting the operation of an example of a component of the client device of the network environment of FIG. 1.

FIG. 6 is a flowchart depicting an example of the operation of a portion of the SDK 149. It is understood that the flowchart of FIG. 6 provides merely an example of the many different types of functional arrangements that can be employed to implement the portion of the SDK 149 as described herein. As an alternative, the flowchart of FIG. 6 can be viewed as depicting an example of elements of a method implemented by the SDK 149 in some implementations.

Beginning at step 603, the SDK 149 receives a request to access the clipboard 141 from a client application 139. For example, a method call to the ClipboardManager class 403/503 can have been intercepted by the SDKClipboardManager class 406/509. Access to the clipboard can include an attempt to store data to the clipboard 141 or to read data from the clipboard 141.

Moving on to step 606, the SDK 149 determines whether the client application 139 is permitted to access the clipboard 141. For example, the SDK 149 can send a query to the management service 113. The query can include an application identifier 133 identifying the client application 139 attempting to access the clipboard 141. The query can also include a device identifier 126 to identify the client device 106 enrolled or registered with the management service 113. The query can further include a user identifier 129 to identify the current user of the client application 139 or client device 106, which can be necessary in those environments where multiple users can be able to access or user the same client device 106 (e.g., multiple users of a computer terminal, laptop, or desktop).

The management service 113 can then provide a response to the SDK 149. For example, the management service 113 can identify the applicable policies 123 and generate a permissions list identifying which client applications 139 the user is allowed to use to access the clipboard 141 and in what manner each client application 139 can be used to access the clipboard (e.g., the user is allowed to retrieve data from the clipboard using any client application 139 but is only allowed to paste data to the clipboard from a short list of approved client applications 139). The management service 113 can then return the permissions list to the SDK 149.

Proceeding next to step 609, the SDK 149 can use the permissions list to enable or disable clipboard 141 access to the client application 139. For example, the SDK 149 can indicate to the client application 139 that paste functions are enabled, but copy or cut functions are disabled. This could in turn cause the client application 139 to display within a user interface element rendered by the client application 139 an option to paste data from the clipboard, but to hide or otherwise indicate as disabled the options to copy or cut data to store into the clipboard 141.

Figure 7:
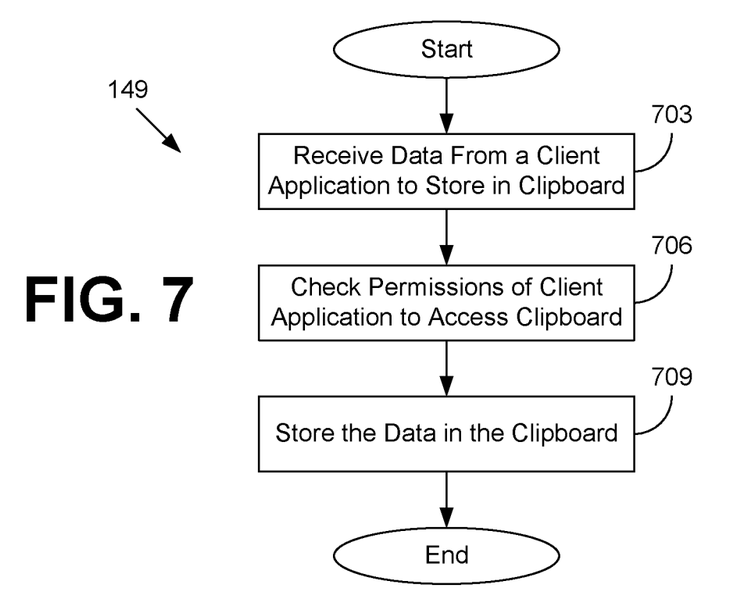
FIG. 7 is a flow chart depicting the operation of an example of a component of the client device of the network environment of FIG. 1.

FIG. 7 is a flowchart depicting an example of the operation of a portion of the SDK 149. It is understood that the flowchart of FIG. 7 provides merely an example of the many different types of functional arrangements that can be employed to implement the portion of the SDK 149 as described herein. As an alternative, the flowchart of FIG. 7 can be viewed as depicting an example of elements of a method implemented by the SDK 149 in some implementations.

Beginning with step 703, the SDK 149 can receive data from a client application 149 to store in the clipboard 141. For example, a method call to the ClipboardManager class 403/503 to store data can be intercepted by the SDKClipboardManager class 406/509. The data can be included as a part of a request by the client application 139 to access the clipboard 141.

Moving on to step 706, the SDK 149 can determine whether the client application 139 is permitted to access the clipboard 141 for data storage purposes. For example, the SDK 149 can send a query to the management service 113. The query can include an application identifier 133 identifying the client application 139 attempting to access the clipboard 141. The query can also include a device identifier 126 to identify the client device 106 enrolled or registered with the management service 113. The query can further include a user identifier 129 to identify the current user of the client application 139 or client device 106, which can be necessary in those environments where multiple users can access or use the same client device 106 (e.g., multiple users of a computer terminal, tablet, laptop, or desktop). In some instances, the SDK 149 can further determine the type of data to be stored in the clipboard 141 and include the data type 136 in the query.

The management service 113 can then provide a response to the SDK 149. For example, the management service 113 can identify the applicable policies 123 and determine that the user's access to the clipboard 141 with the client application 139 is permitted on that client device 106. In this example, the management service 113 could provide a response indicating that the access to the clipboard 141 is authorized. As another example, the management service 113 could determine, based on the identified applicable policies 123, that the user is unauthorized to copy images from the client application 139 to the clipboard. If the data type 136 supplied in the query indicated that the data to be saved to the clipboard 141 was text data, then the management service 113 could provide a response indicating that the access to the clipboard 141 is authorized.

Referring next to step 709, the SDK 149 can save the data provided by the client application to the clipboard 141. In some instances, the SDK 149 can invoke the API provided by the operating system 143 to store data in the clipboard 141. In other instances, the SDK 149 can instead store the data in its own data buffer that replicates the clipboard 141 to more completely control which users or applications have access to the data in the clipboard 141.

In some implementations, the SDK 149 may encrypt the data as it is stored to the clipboard 141 using a private or temporary encryption key. The private or temporary encryption key may be randomly generated each time the client device 106 is powered on. Encrypting the data prior to storage in the clipboard 141 protects the data from being read by unauthorized processes (e.g., a hacked web browser, a virus, or other maliciously installed application). In some implementations, encryption may be enabled by default or the behavior may be specified by a policy 123. If specified by a policy 123, the requirement to encrypt the data can be indicated by the management service 113 as part of the response indicating that access to the clipboard 141 by the user or client application 139 is authorized.

Figure 8:
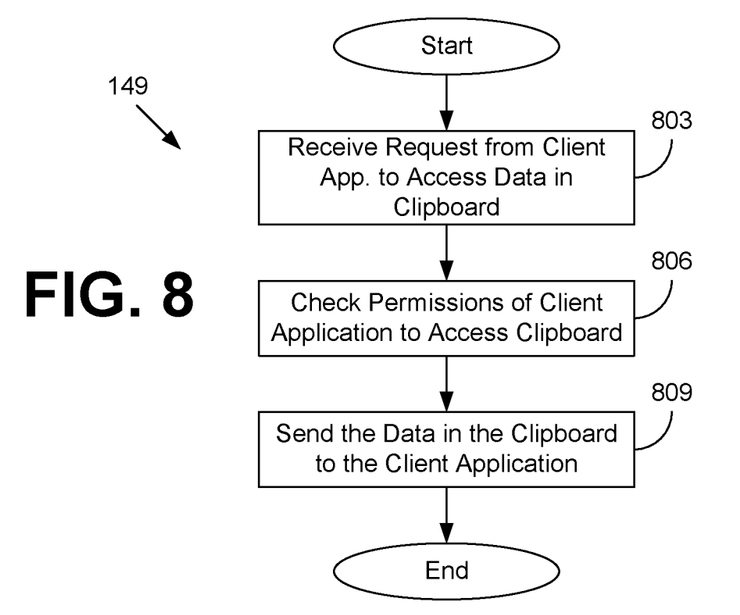
FIG. 8 is a flow chart depicting the operation of an example of a component of the client device of the network environment of FIG. 1.

FIG. 8 is a flowchart depicting an example of the operation of a portion of the SDK 149. It is understood that the flowchart of FIG. 8 provides merely an example of the many different types of functional arrangements that can be employed to implement the portion of the SDK 149 as described herein. As an alternative, the flowchart of FIG. 8 can be viewed as depicting an example of elements of a method implemented by the SDK 149 in some implementations.

Beginning with step 803, the SDK 149 can receive a request from a client application 149 to access data stored in the clipboard 141. This request can correspond to an attempt to paste data stored in the clipboard 141 into a client application 139. For example, a method call to the ClipboardManager class 403/503 to retrieve data stored in the clipboard can be intercepted by the SDKClipboardManager class 406/509.

Moving on to step 806, the SDK 149 can determine whether the client application 139 is permitted to access the clipboard 141 to retrieve the data stored in the clipboard 141. For example, the SDK 149 can send a query to the management service 113. The query can include an application identifier 133 identifying the client application 139 attempting to access the clipboard 141. The query can also include a device identifier 126 to identify the client device 106 enrolled or registered with the management service 113. The query can further include a user identifier 129 to identify the current user of the client application 139 or client device 106, which can be necessary in those environments where multiple users can access or use the same client device 106 (e.g., multiple users of a computer terminal, tablet, laptop, or desktop). In some instances, the SDK 149 can further determine the data type 136 of the data currently stored in the clipboard 141 and include the data type 136 in the query.

The management service 113 can then provide a response to the SDK 149. For example, the management service 113 can identify the applicable policies 123 and determine that the user's access to the clipboard 141 with the client application 139 is permitted on that client device 106. In this example, the management service 113 could provide a response indicating that the access to the clipboard 141 is authorized. As another example, the management service 113 could determine, based on the identified applicable policies 123, that the user is not allowed to paste images from the clipboard 141 into the client application 139. If the data type 136 supplied in the query indicated that the data stored in the clipboard 141 was text data, then the management service 113 could provide a response indicating that the access to the clipboard 141 is authorized.

Referring next to step 809, the SDK 149 can then send or otherwise provide the data stored in the clipboard 141 to the client application 139. In some instances, the SDK 149 can invoke the API provided by the operating system 143 to paste data from the clipboard 141. In other instances, the SDK 149 can instead paste data previously stored in its own data buffer that replicates the clipboard 141. In those implementations where data is encrypted when stored to the clipboard 141, the SDK 149 can decrypt the data prior to sending or providing it to the client application 139.

The flowcharts of FIGS. 6-8 show examples of the functionality and operation of implementations of components described herein. The components described herein can include hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 6-8 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all variations are within the scope of the present disclosure.

The components described herein can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit.

The components described herein can be embodied in the form of hardware, as software components that are executable by hardware, or as a combination of software and hardware. If embodied as hardware, the components described herein can be implemented as a circuit or state machine that employs any suitable hardware technology. This hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All modifications and variations are intended to be included herein within the scope of this disclosure.

Therefore, the following is claimed:

1. A system for providing policy-based access to a clipboard, comprising:
    a computing device comprising a processor and a memory;
    an operating system stored in the memory, the operating system providing the clipboard class, an individual instance of which can be used by a client application executing on the computing device to access a clipboard provided by the operating system of the computing device; and
    machine readable instructions stored in the memory that extend the clipboard class and, when executed by the processor, cause the computing device to at least:
        intercept a request from the client application to access the clipboard, wherein the request comprises data to be stored in the clipboard;
        check a permission associated with the client application, wherein the permission is checked by:
            transmitting a query over a network to a management service, the query including a device identifier assigned to the computing device by the management service, the management service using the device identifier to manage an operation of the computing device; and receiving a response from management service, the response indicating that the client application is authorized to store the data in the clipboard;
generate encrypted data based on the data received from the client application using a temporary encryption key, wherein the temporary encryption key is generated at a point in time in which the computing device was powered on; and
store the encrypted data in the clipboard.

2. The system of claim 1 for providing policy-based access to the clipboard, wherein the client application is a first client application, the permission is a first permission, and the machine readable instructions further cause the computing device to at least:
receive, from a second client application, a request for the data stored in the clipboard that was previously received from the first client application
check a second permission associated with the second client application, the second permission specifying that the second client application is authorized to retrieve the data stored in the clipboard that was previously received from the first client application; and
send to the second client application the data stored in the clipboard that was previously received from the first client application.

3. The system of claim 1 for providing policy-based access to the clipboard, wherein the query comprises an identifier of the client application and a user identifier.

4. The system of claim 3 for providing policy-based access to the clipboard, wherein the query further identifies a type for the data to be stored in the clipboard.

5. The system of claim 1 for providing policy-based access to the clipboard, wherein generating the encrypted data from the data received by the client application using the temporary encryption key further comprises:
querying the management service for a policy; and
determining, based at least in part on the policy, that the data received from the client application prior to storage of the data in the clipboard is to be encrypted.

6. The system of claim 1 for providing policy-based access to the clipboard, wherein the computing device is a mobile device and the operating system is a version of an ANDROID operating system.

7. A computer-implemented method for providing policy-based access to a clipboard, comprising:
intercepting a request from a client application to access the clipboard, the client application being executed on a computing device, the clipboard being provided by an operating system of the computing device, and the request comprising data to be stored in the clipboard;
checking a permission associated with the client application, wherein the permission is checked by:
transmitting a query over a network to a management service, the query including a device identifier assigned to the computing device by the management service, the management service using the device identifier to manage an operation of the computing device; and
receiving a response from management service, the response indicating that the client application is authorized to store the data in the clipboard;
generating encrypted data based on the data received from the client application using a temporary encryption key, wherein the temporary encryption key is generated at a point in time in which the computing device was powered on; and
storing the encrypted data in the clipboard.

8. The computer-implemented method of claim 7 for providing policy-based access to the clipboard, wherein the client application is a first client application, the permission is a first permission, and the method further comprises:
receiving, from a second client application, a request for the data stored in the clipboard that was previously received from the first client application
checking a second permission associated with the second client application, the second permission specifying that the second client application is authorized to retrieve the data stored in the clipboard that was previously received from the first client application; and
sending to the second client application the data stored in the clipboard that was previously received from the first client application.

9. The computer-implemented method of claim 7 for providing policy-based access to the clipboard, wherein the query further identifies a type for the data to be stored in the clipboard.

10. The computer-implemented method of claim 7 for providing policy-based access to the clipboard, wherein generating encrypted data further comprises:
querying the management service for a policy;
determining, based at least in part on the policy, that the data received from the client application prior to storage of the data in the clipboard is to be encrypted.

11. The computer-implemented method of claim 7 for providing policy-based access to the clipboard, the operating system is a version of an ANDROID operating system.

12. A non-transitory computer readable medium embodying executable instructions which, when executed by a processor, cause a computing device to at least:
intercept a request from a client application to access a clipboard, the client application being executed on the computing device, the clipboard being provided by an operating system of the computing device, and the request comprising data to be stored in the clipboard;
check a permission associated with the client application, wherein the permission is checked by:
transmitting a query over a network to a management service, the query including a device identifier assigned to the computing device by the management service, the management service using the device identifier to manage an operation of the computing device; and
receiving a response from management service, the response indicating that the client application is authorized to store the data in the clipboard;
generate encrypted data based on the data received from the first client application using a temporary encryption key, wherein the temporary encryption key is generated prior to receiving the data from the client application; and
store the encrypted data in the clipboard.

13. The non-transitory computer readable medium of claim 12, wherein the machine readable instructions that cause the computing device to check the permission associated with the second client application further comprise machine readable instructions that cause the computing device to at least:
send a query across a network to a management service, the query comprising an identifier of the second client application and at least one of a user identifier or a device identifier; and receive a response from the management service, the response indicating
that the second client application is authorized to access the data stored in the clipboard.

14. The non-transitory computer readable medium of claim 13, wherein the query further identifies a type for the data to be stored in the clipboard.

15. The non-transitory computer readable medium of claim 12, wherein generating the encrypted data from the data received by the client application using the temporary encryption key further comprises:
querying the management service for a policy; and
determining, based at least in part on the policy, that the data received from the client application prior to storage of the data in the clipboard is to be encrypted.

16. The non-transitory computer readable medium of claim 12, wherein the computing device is a mobile device and the operating system is a version of the ANDROID operating system.

17. The system of claim 12 for providing policy-based access to the clipboard, wherein the machine readable instructions stored in the memory that extend the clipboard class and, when executed by the processor, cause the computing device to at least:
display an administrative user interface that includes a plurality of clipboard settings;
receive a selection of a subset of the plurality of clipboard settings, wherein the selection is stored in association with a policy for a device identifier.

* * * * *